US012571706B2

(12) United States Patent
Lai et al.

(10) Patent No.: US 12,571,706 B2
(45) Date of Patent: Mar. 10, 2026

(54) MULTIPURPOSE SAMPLING APPARATUS FOR CHEMICAL ANALYZER

(71) Applicant: Viken Detection Corporation, Burlington, MA (US)

(72) Inventors: Hanh Lai, Arlington, MA (US); Brandon Chiou, Burlington, MA (US)

(73) Assignee: Viken Detection Corporation, Burlington, MA (US)

( * ) Notice: Subject to any disclaimer, the term of this patent is extended or adjusted under 35 U.S.C. 154(b) by 861 days.

(21) Appl. No.: 17/422,375

(22) PCT Filed: Jan. 14, 2020

(86) PCT No.: PCT/US2020/013573
§ 371 (c)(1),
(2) Date: Jul. 12, 2021

(87) PCT Pub. No.: WO2020/150284
PCT Pub. Date: Jul. 23, 2020

(65) Prior Publication Data
US 2022/0120640 A1 Apr. 21, 2022

Related U.S. Application Data

(60) Provisional application No. 62/792,009, filed on Jan. 14, 2019.

(51) Int. Cl.
| | |
|---|---|
| *B01L 3/00* | (2006.01) |
| *B01L 7/00* | (2006.01) |
| *G01N 1/02* | (2006.01) |

(52) U.S. Cl.
CPC ................. *G01N 1/02* (2013.01); *B01L 3/50* (2013.01); *B01L 7/00* (2013.01);
(Continued)

(58) Field of Classification Search
CPC ...... B01L 3/50; B01L 7/00; B01L 2300/0832; B01L 2300/1827; G01N 1/02; G01N 2001/022; G01N 2001/028
See application file for complete search history.

(56) References Cited

U.S. PATENT DOCUMENTS

| | | | | |
|---|---|---|---|---|
| 8,728,414 B2 * | 5/2014 | Beach | .................... | A61B 10/02 |
| | | | | 422/549 |
| 9,953,820 B2 * | 4/2018 | Piper | ........................ | G01N 1/44 |
| | (Continued) | | | |

FOREIGN PATENT DOCUMENTS

| | | |
|---|---|---|
| CN | 104662404 A | 5/2015 |
| WO | 2010130055 A1 | 11/2010 |
| | (Continued) | |

OTHER PUBLICATIONS

Notification of Transmittal of the International Search Report and the Written Opinion of the International Searching Authority, or the Declaration for International Application No. PCT/US2020/013573, "Multipurpose Sampling Apparatus for Chemical Analyzer", Dated: Apr. 20, 2020.
(Continued)

*Primary Examiner* — Jill A Warden
*Assistant Examiner* — Michael Stanley Gzybowski
(74) *Attorney, Agent, or Firm* — Merchant & Gould P.C.

(57) ABSTRACT

A sampling apparatus includes a wand extension coupled with a trace detection head and a bulk detection head. The trace detection head collects a maximum amount of a sample for a trace detection analysis. The bulk detection head collects a minimal amount of a substance for use in bulk sample identification.

28 Claims, 11 Drawing Sheets

(52) U.S. Cl.
CPC .................. *B01L 2300/0832* (2013.01); *B01L 2300/1827* (2013.01); *G01N 2001/022* (2013.01); *G01N 2001/028* (2013.01)

(56)                       References Cited

U.S. PATENT DOCUMENTS

| | | | |
|---|---|---|---|
| 2004/0265169 A1* | 12/2004 | Haas ...................... | G01N 31/22 |
| | | | 422/411 |
| 2012/0091335 A1 | 4/2012 | Thompson | |
| 2016/0202149 A1* | 7/2016 | Thomson ................ | G01N 1/02 |
| | | | 73/864.71 |

FOREIGN PATENT DOCUMENTS

| | | | |
|---|---|---|---|
| WO | 2014045057 A1 | 3/2014 | |
| WO | 2014146197 A1 | 9/2014 | |
| WO | 2017/142571 A1 | 8/2017 | |

OTHER PUBLICATIONS

Notification Concerning Transmittal of International Preliminary Report on Patentability for International Application No. PCT/US2020/013573, "Multipurpose Sampling Apparatus for Chemical Analyzer", date of mailing: Jul. 29, 2021.

* cited by examiner

MULTIPURPOSE SAMPLING APPARATUS FOR CHEMICAL ANALYZER

RELATED APPLICATION

This application is the U.S. National Stage of International Application No. PCT/US2020/013573, filed Jan. 14, 2020, which designates the U.S., published in English and claims the benefit of U.S. Provisional Application No. 62/792,009, filed on Jan. 14, 2019. The entire teachings of the above applications are incorporated herein by reference.

BACKGROUND

Analytical instruments that are used for trace detection, including ion mobility spectrometers, mass spectrometers, and chemical sensor devices (e.g., gas chromatographs, electrochemical sensors, and fluorescent chemical sensors), are highly sensitive instruments designed to detect small amounts of analytes from a sample, often as low as a nanogram. Accompanying a trace detection system is a sampling apparatus that collects vapors or residues from an object or a surface. The sampling apparatus is designed to maximize collection efficiency to ensure substances of interest are above the level of detection of the instrument.

Trace detection systems work well when the amount of sample introduced is in the nanogram to low microgram range. When the amount of sample is too large, the analytical instrument can require a long clean cycle (or cycles) to reduce memory effect before the instrument is ready for subsequent analysis. For this reason, trace detection systems are not well suited for material identification of a substance of interest from a bulk sample (e.g., powders and pills). Accordingly, material identification from a bulk sample is typically conducted using other types of detectors, such as Raman spectroscopy or Fourier-transform infrared spectroscopy (FTIR), to analyze the sample directly, instead of swabbing with a collection device and analyzing by a trace detector.

In some cases, sampling and analysis from a bulk sample with a trace detector requires utilizing multiple disposable sample collection swabs to decrease the amount of material delivered to the detector. This procedure is wasteful and cumbersome.

SUMMARY

The sampling apparatus for chemical analyzer described herein allows collection of maximum amounts of residue from surface contamination for trace detection analysis and collection of small amounts of a residue from a bulk sample for bulk detection analysis. Analysis can be performed by a wide variety of analytical instruments.

Described herein is a sampling apparatus for chemical analyzer. The sampling apparatus can include a wand extension having ends coupled with a trace detection head and with a bulk detection head. The trace detection head can include a body for receiving a swab support and configured for coupling with the wand extension; and a retainer for coupling a swab to the body of the trace detection head. The bulk detection head can include a body for receiving a bulk collector. The bulk collector can include a base and a member that extends perpendicular from the base of the bulk collector.

The retainer can be a retaining ring. The body of the trace detection head can have a groove for receiving a shuttle that is connected to the retaining ring. A magnet can be positioned within the groove for magnetic coupling with a magnet positioned within the shuttle. The groove can have a distal magnet and a proximal magnet to hold the shuttle in an open and closed position, respectively. The swab support can have a resistive heating element. The resistive heating element can be electrically coupled to an electrical contact on the body of the trace detection head. The electrical contact can be configured to contact an electrical contact of an analytic instrument upon registration of the trace detection head with the analytical instrument. The swab support can have a base, the base having a surface area from about 1 cm² to about 100 cm².

The member that extends perpendicular from the base of the bulk collector can further include a base with the resistive heating element. The base of the member that extends perpendicular from the bulk collector can have a surface area less than about 1 cm². The base of the member that extends perpendicular from the bulk collector can have a surface are from about 0.1 cm² to about 1 cm².

One or more of the trace and bulk detection heads can be removable. The wand extension can have a threaded interface for coupling with a mating threaded interface of the trace detection head or for coupling with a mating threaded interface of the bulk detection head. An O-ring or gasket can seal the interface between the wand extension and the trace detection head or the bulk detection head.

Described herein is a removable trace detection head. The removable trace detection head can include a body for receiving a swab support and configured for coupling with a wand extension; and a retaining ring for coupling a swab to the body of the trace detection head. The body of the trace detection head can have a groove for receiving a shuttle that is connected to the retaining ring. A magnet can be positioned within the groove for magnetic coupling with a magnet positioned within the shuttle. The groove can have a distal magnet and a proximal magnet to hold the shuttle in an open and closed position, respectively. The swab support can include a resistive heating element, which can be electrically coupled to an electrical contact on the body of the trace detection head. The swab support can have a base, the base having a surface area from about 1 cm² to about 100 cm².

Described herein is a removable bulk detection head. The removable bulk detection head can include a body for receiving a bulk collector. The bulk collector can include a base and a member that extends perpendicular from the base of the bulk collector. The member that extends perpendicular from the base of the bulk collector can further include a base with the resistive heating element. The base of the member that extends perpendicular from the bulk collector can have a surface area less than about 1 cm². The base of the member that extends perpendicular from the bulk collector can have a surface are from about 0.1 cm² to about 1 cm².

Described herein is a kit for a sampling apparatus. The kit can include a wand extension having opposing ends for coupling with detection heads; a trace detection head; and a bulk detection head. The trace detection head can include a body for receiving a swab support and configured for coupling with the wand extension; and a retainer for coupling a swab to the body of the trace detection head. The bulk detection head can include a body for receiving a bulk collector. The bulk collector can include a base and a member that extends perpendicular from the base of the bulk collector.

Described herein is a kit for a sampling apparatus. The kit can include a wand extension having opposing ends for coupling with detection heads; and a detection head that has a body for receiving a swab support or bulk collector and configured for coupling with the wand extension. The kit can further include a swab support. The kit can further include a retainer for coupling a swab to the body of the detection head. The kit can further include a bulk collector.

Described herein is a sampling apparatus for chemical analyzer. The sampling apparatus can include a wand extension having an end coupled with a trace detection head. The trace detection head can include a body for receiving a swab support and configured for coupling with the wand extension; and a retainer for coupling a swab to the body of the trace detection head.

Described herein is a sampling apparatus for chemical analyzer. The sampling apparatus can include a wand extension having an end coupled with a bulk detection head. The bulk detection head can include a body for receiving a bulk collector. The bulk collector can include a base and a member that extends perpendicular from the base of the bulk collector.

Described herein is a sampling apparatus for chemical analyzer. The apparatus can include a trace detection head including a sampling interface and a wand extension interface; a bulk detection head including a sampling interface and a wand extension interface; and a wand extension including a first interface to which the trace detection head is mechanically coupled and second interface to which the bulk detection head is mechanically coupled, the combination of trace detection head, bulk detection head, and wand extension defining a wand.

The trace detection head and bulk detection head can be removably coupled from the wand extension via the first and second interfaces, respectively. The trace detection head, wand extension, and bulk detection head form a linear apparatus when in a coupled arrangement. The trace detection head sampling interface defines a swab support, and can further include a retainer configured to couple a swab to the swab support in a fixed arrangement. The trace detection head can further include a heater element in thermal communication with the swab support. The trace detection head can further include an electrical interface configured to couple to a corresponding electrical interface of the analytic instrument. The electrical interface can be coupled to an electrical path between the electrical interface and the heater element to enable the heater element to be energized and generate heat when the trace detection head is in a coupled arrangement with the analytic instrument.

The bulk detection head sampling interface can include a collector, with an integrated heater element, the collector projecting from (i) a surface of the bulk detection head or (ii) a surface of an element coupled to the bulk detection head.

The bulk detection head can further includes an electrical interface configured to couple to a corresponding electrical interface of the analytic instrument. The electrical interface can be coupled to an electrical path between the electrical interface and the integrated heater element to enable the integrated heater element to be energized and generate heat when the bulk detection head is in a coupled arrangement with the analytic instrument.

Samples can be analyzed by any sampling apparatus described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2A is a perspective view without a sampling swab. FIG. 2B is a perspective view with a sampling swab. FIG. 2C is a perspective sectional view of the trace detection head.

FIG. 3A is a perspective view with a sampling swab. FIG. 3B is a side sectional view. FIG. 3C is a perspective sectional view of the trace detection head.

DETAILED DESCRIPTION

A description of example embodiments follows.

Trace analysis typically encompasses swabbing an item of interest, such as an electronic device (e.g., laptop, cell phone) at a security checkpoint, to detect whether small quantities of chemical and/or biological analytes of interest are present. Common analytes of interest include drugs and other controlled substances, explosives, and other contraband. Security checkpoints are commonly found at airports and international border crossings.

Bulk analysis typically encompasses obtaining a sample for detection. For example, police officers, border control agents, and other law enforcement personnel may obtain a sample of suspected contraband for detection. It is typically desirable to introduce only a small amount (e.g., nanogram to low microgram range) of a sample into an analytical instrument. Introducing too much of a sample into an analytical instrument can overload the instrument and associated equipment (e.g., detector system). Sample collection from a bulk sample and delivery to an analytical instrument for analysis can be carried out through various ways. One way is for the bulk detection head to make minimal contact with the bulk sample. Another way is for the bulk detection head to deliver a minimal amount of material that was collected.

In many embodiments, the sampling apparatus has two sample collection heads. A trace detection head is designed to maximize the quantity of sample collected for use in a trace analysis operation. A bulk detection head is designed to collect only a small amount (e.g., nanogram to low microgram range) of sample for use in a bulk analysis operation. When the sampling apparatus has both a trace detection head and a bulk detection head, a single sampling apparatus can be used for both sample collection modes.

In other embodiments, the sampling apparatus has a single sampling head (either trace or bulk), which can be removable and interchangeable. For example, a trace detection head or a bulk detection head can be inserted onto (coupled with) a wand extension.

Figure 1A:
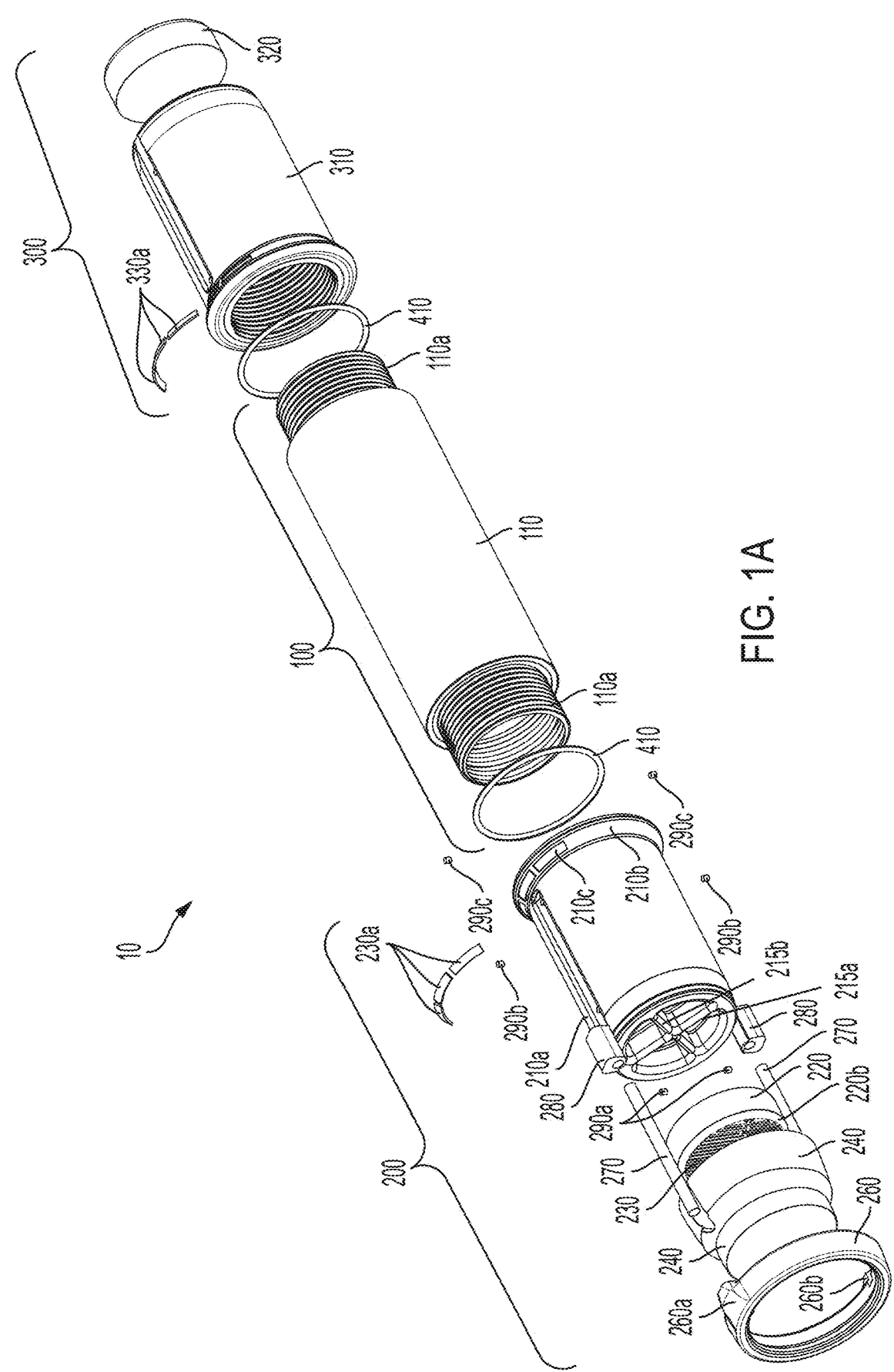
FIG. 1A is an exploded perspective view of a sampling apparatus having a trace sampling head and a bulk detection head.
Figure 1B:
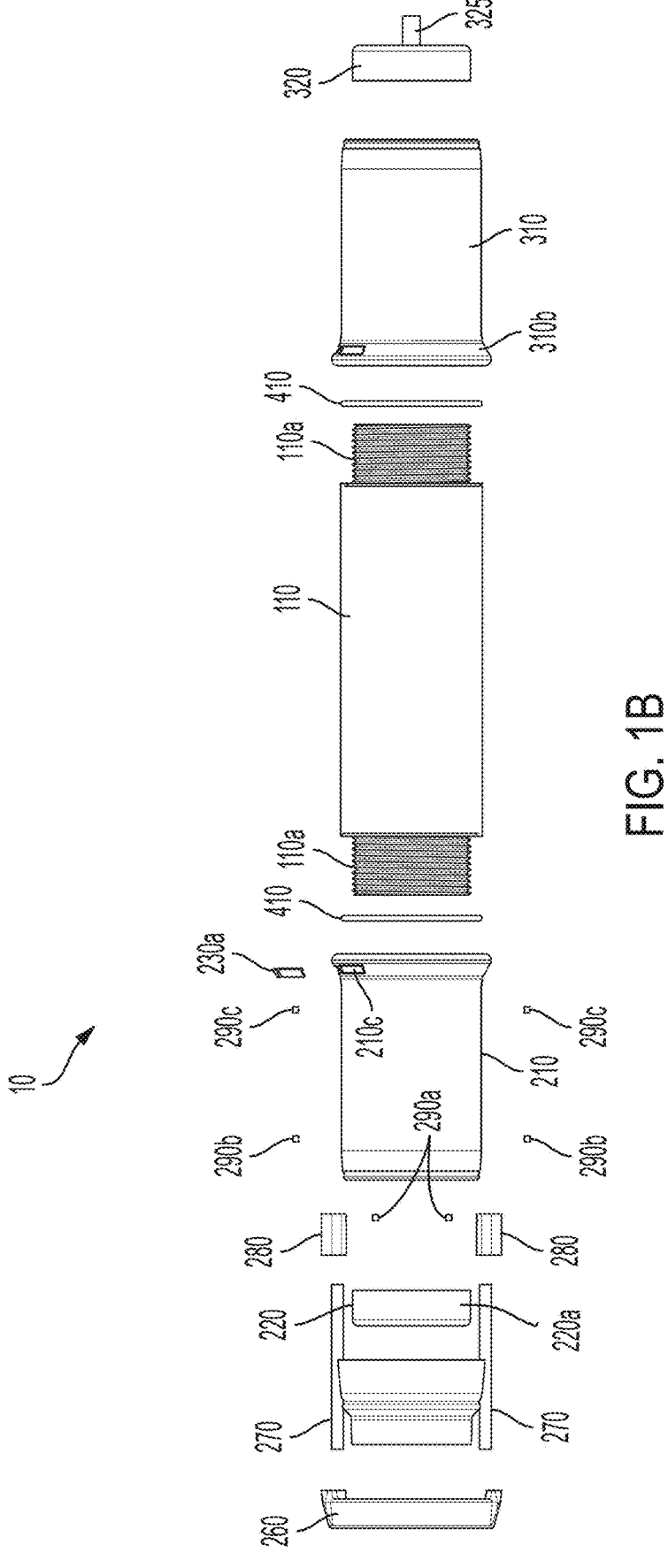
FIG. 1B is an exploded side view of a sampling apparatus having a trace sampling head and a bulk detection head.

FIGS. 1A and 1B are schematics of an embodiment of sampling apparatus 10 for chemical analyzer, which is sometimes also referred to as a wand. The sampling apparatus 10 has a wand extension 100, a trace detection head 200, and a bulk detection head 300. Typically, the wand extension 100, trace detection head 200, and bulk detection head 300 are substantially cylindrical, but a cylindrical geometry is not required. Wand extension 100 can be formed of plastic, but other materials are permissible. Trace detection head 200 and bulk detection head 300 can be formed of a material that is suitable for operating at high temperature with low outgassing property. Examples include silicones, plastics, ceramics, carbon fiber, carbon fiber-filled plastics, fiberglass, and fiberglass-filled plastics.

Wand extension 100 is formed of body 110, which can be a hollow cylinder. Opposing ends of body 100 have a threaded portion 110a, which is configured for coupling with threaded portion 240a of trace detection head 200 or with threaded portion 340a of bulk detection head 300. As illustrated, threaded portion 110a is male threading and threaded portions 240 and 340a are female threading, but this can be reversed. An O-ring 410 or gasket can be positioned at the interface of wand extension 100 and either trace detection head 200 or bulk detection head 300 to contribute to an improved seal.

The trace detection head 200 is designed to maximize surface area coverage when swabbing an item to collect a sample for trace analysis. Preferably, the trace detection head maximizes release of any substances collected for trace analysis.

As illustrated, trace detection head 200 has a body 210 with supports 215a and 215b, which is adapted for receiving a swab support 220. As illustrated, body 210 and swab support 220 are cylindrical, though this geometry is not required. Swab support 220 has side surface 220a and a base 220b that receives a swab 240. In some embodiments, swab support 220 has a diameter of about 2 cm. In some embodiments, circular base 220b has a surface area from about 1 $cm^2$ to about 100 $cm^2$. As illustrated, body 210 is hollow, but it is not required to be hollow.

In some embodiments, swab support 220 can be removable. Swab support 220 can be press-fit onto body 210, which has one or more supporting cross members 215a and 215b. The particular geometry and arrangement of supporting cross members 215a and 215b illustrated is not required, as a variety of suitable shapes are permissible. A cut-out solid, as illustrated, reduces weight. In other embodiments, swab support 220 is a fixed component of trace detection head 200.

The trace detection head is configured to receive a sampling swab 240, which can be disposable or reusable. In the embodiment illustrated in the figures, trace detection head 200 includes collar or retaining ring 260, which slides laterally over body 210 to couple a sampling swab 240 to the trace detection head 200. Retaining ring 260 receives push rods 270 in receiving portion 260a. Push rods 270, which can be metal, are configured for insertion into shuttle 280, which has magnet 290a inserted within. Body 210 has grooves 210a configured for receiving push rods 270. Within grooves 210a are distal magnets 290b and proximal magnets 290c. Magnets 290a, 290b, and 290c can be retained in place by use of epoxy, glue, or other adhesive.

Figure 2A:
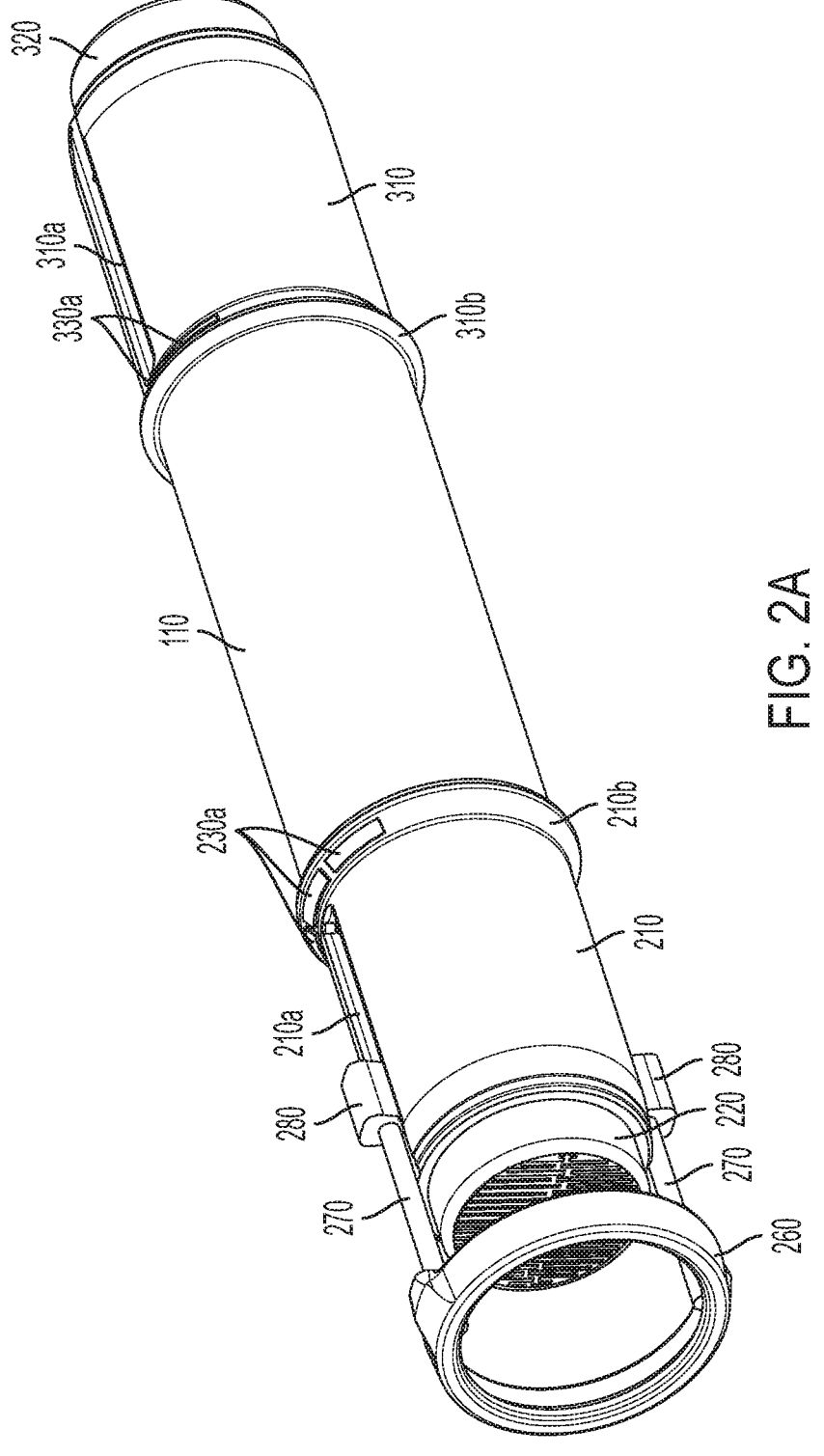
FIGS. 2A-C are the sampling apparatus of FIGS. 1A-B with the trace detection head in an open configuration.
Figure 2B:
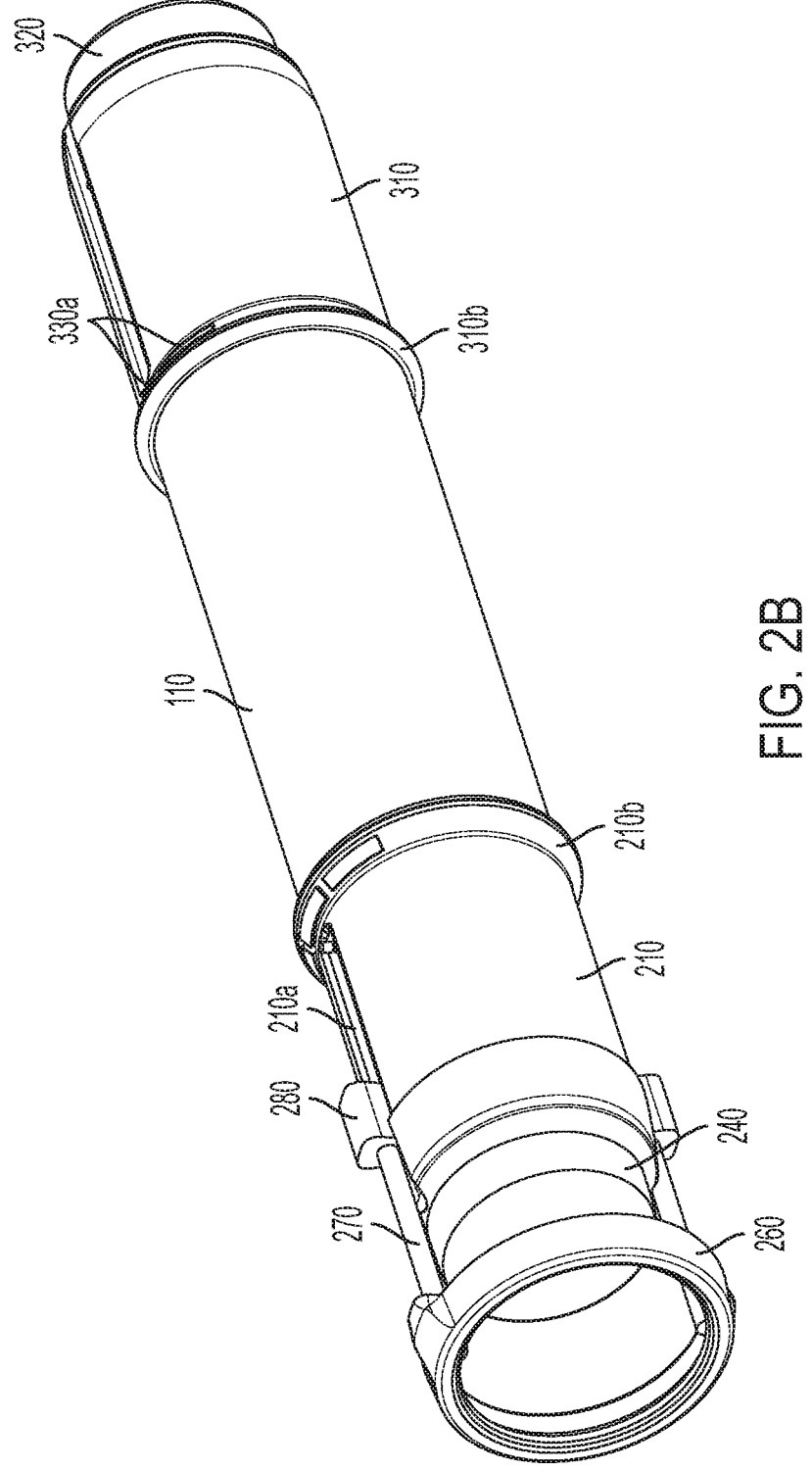
Figure 2C:
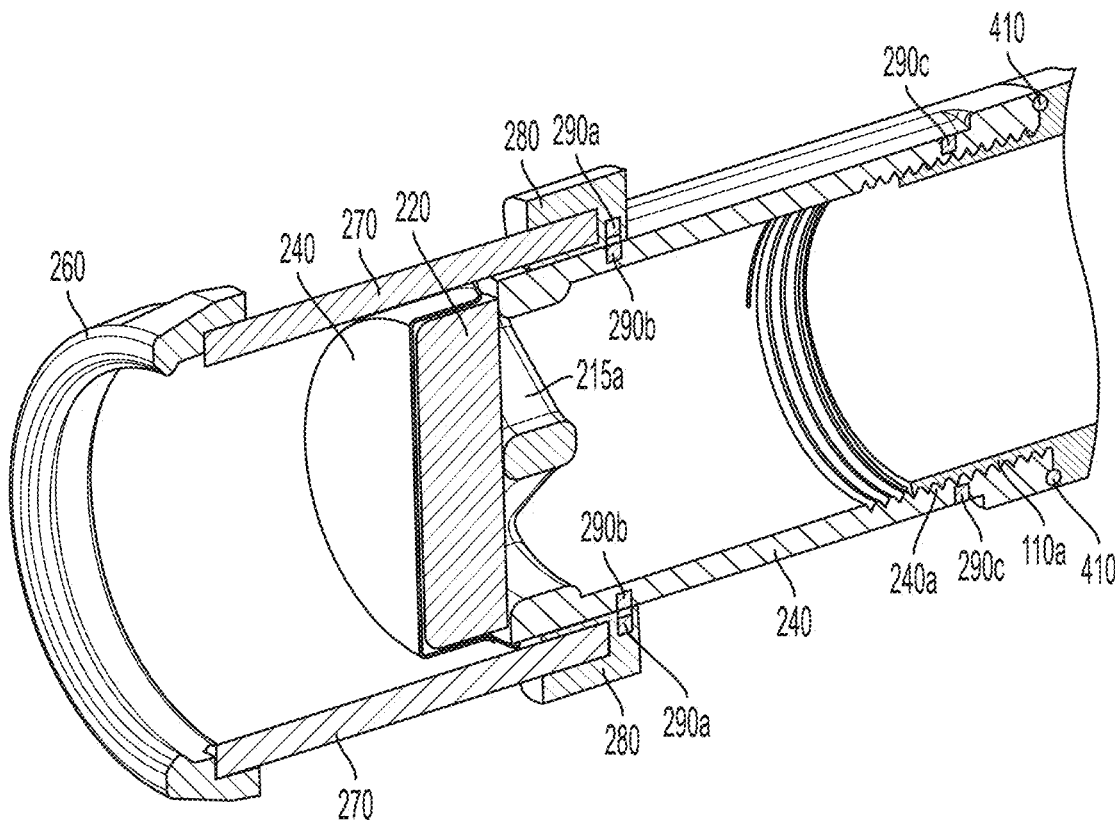
Figure 3A:
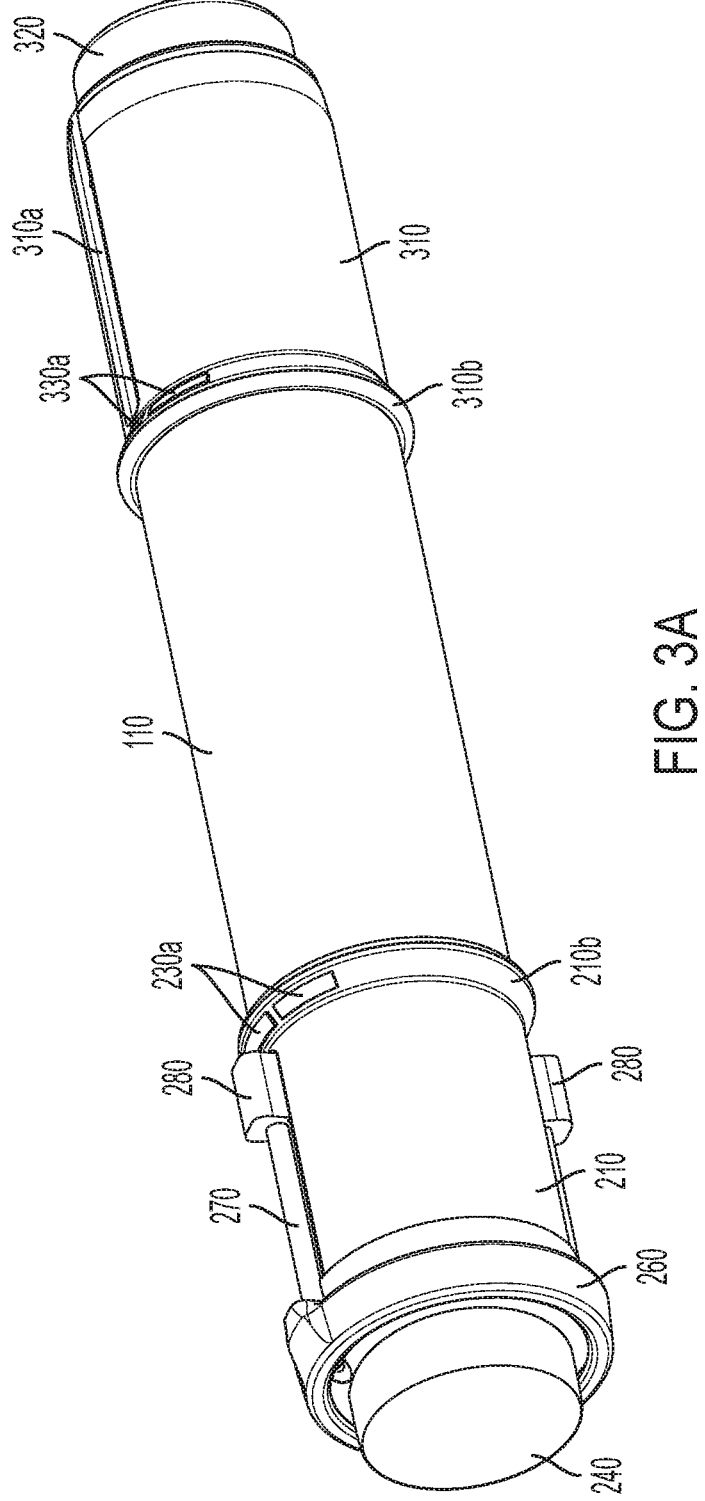
FIGS. 3A-C are the sampling apparatus of FIGS. 1A-B with the trace detection head in a closed configuration.
Figure 3B:
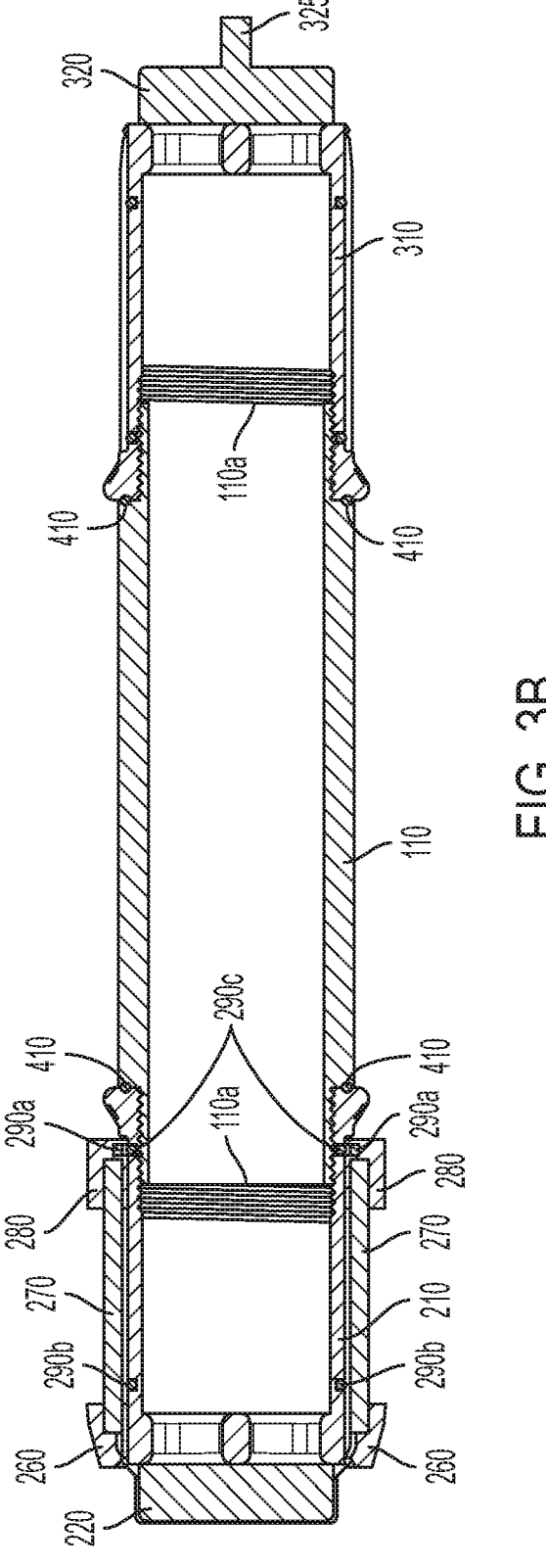
Figure 3C:
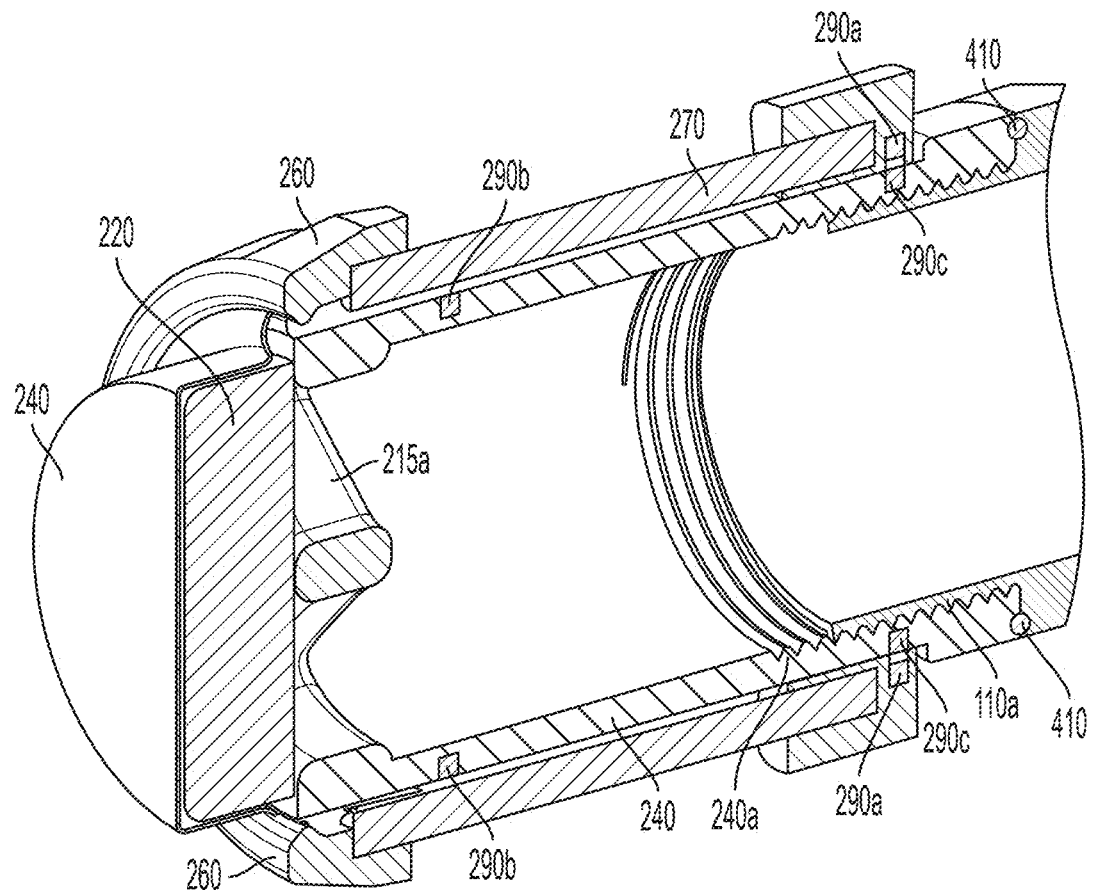
Figure 4:
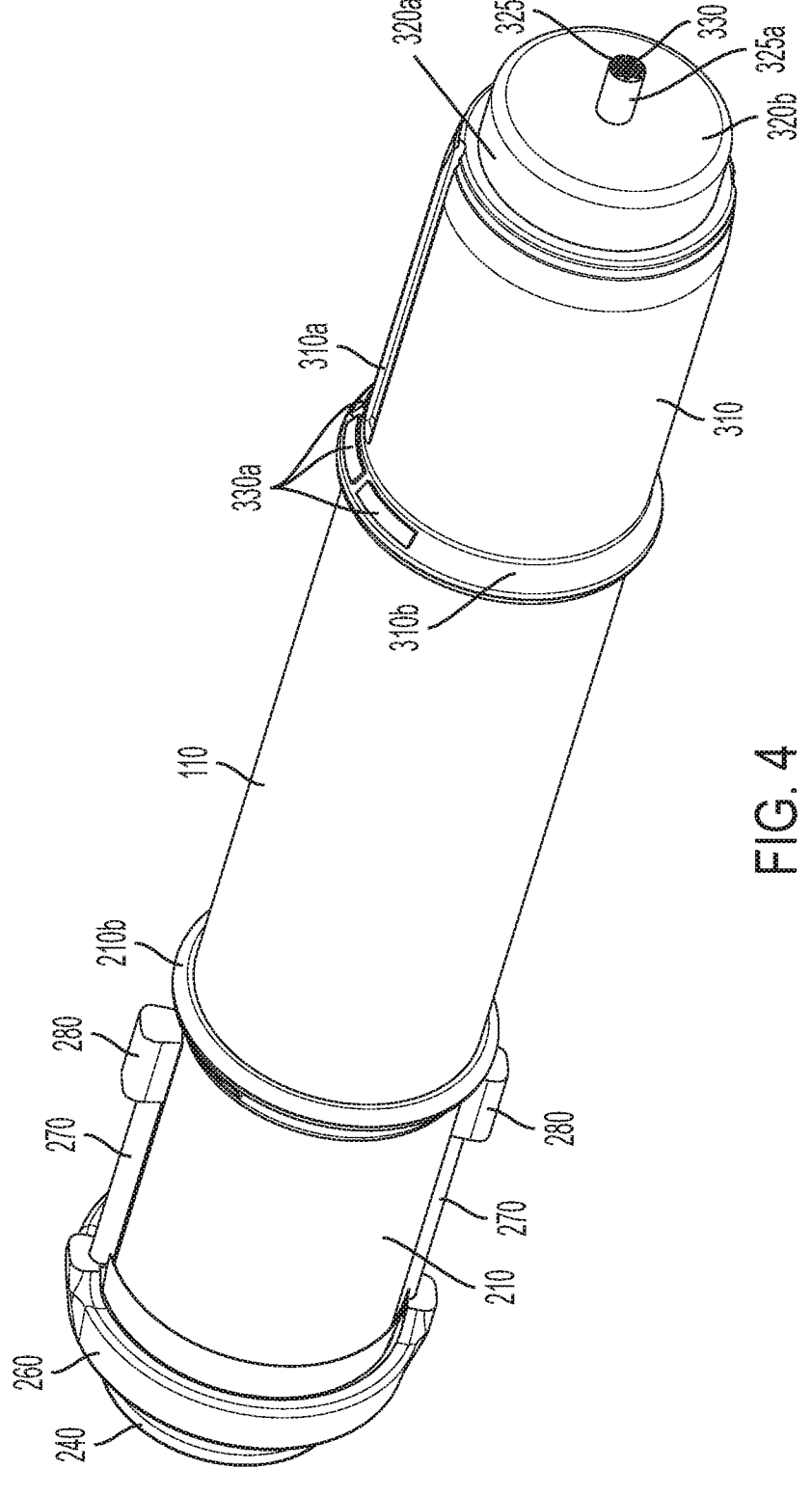
FIG. 4 is a perspective view of the sampling apparatus of FIGS. 1A-B showing the bulk detection head.
Figure 5:
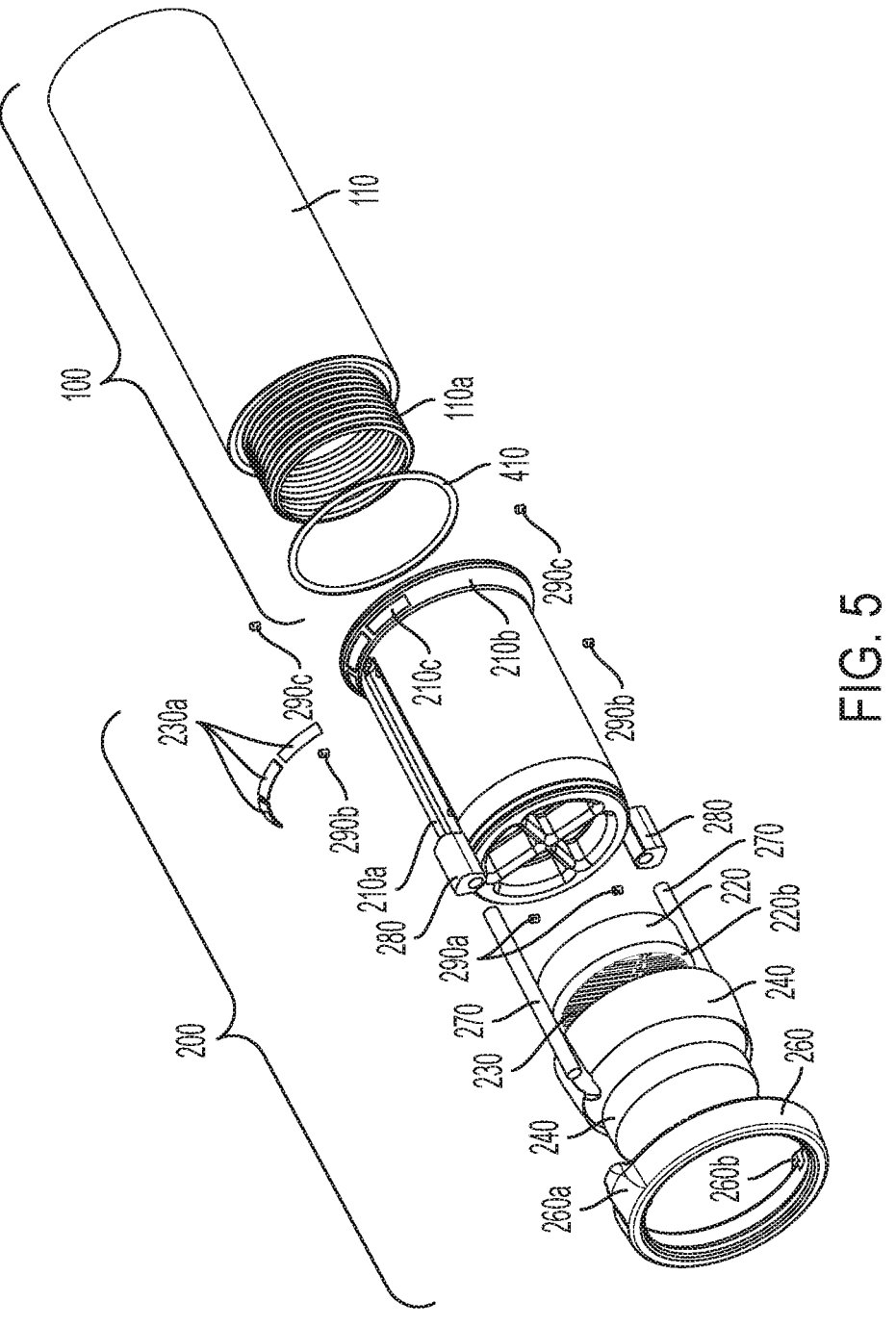
FIG. 5 is an exploded perspective view of a sampling apparatus having only a trace detection head.
Figure 6:
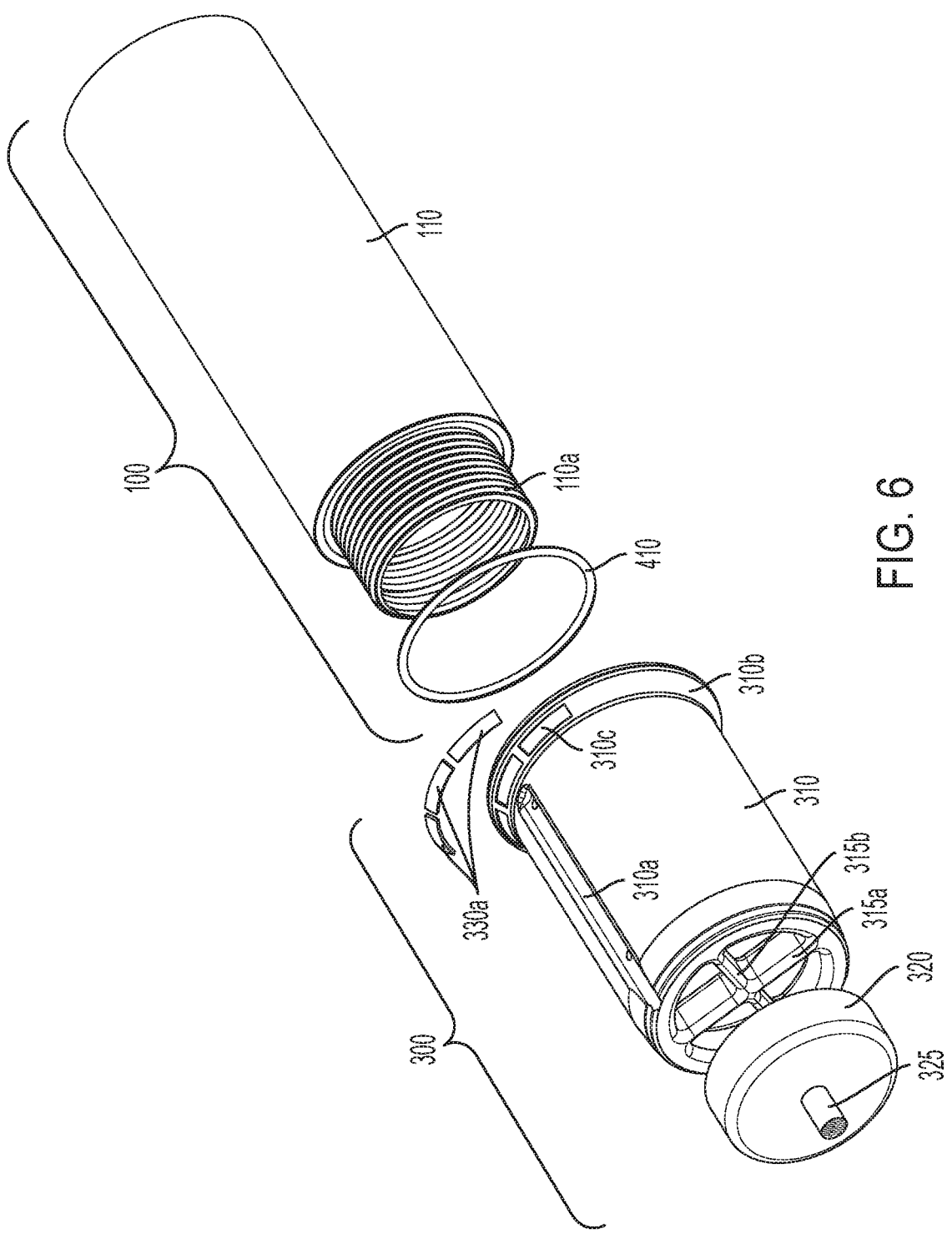
FIG. 6 is an exploded perspective view of a sampling apparatus having only a bulk detection head.

To place a sampling swab 240 onto swab support 220, the retaining ring 260, push rods 270, and shuttle 280 are placed in the open position (FIGS. 2A-C). Distal magnets 290b in grooves 210a of body 210 magnetically couple with magnets 290a of shuttle 280 to hold the retaining ring 260 in the open position. The shuttles 280 can slide along grooves 210a of body 210, until magnets 290a of shuttles 280 magnetically couple with proximal magnets 290c of body 210. In this way, magnetic coupling of magnets 290a and 290c secure the retaining ring 260 so that it holds swab 240 against swab support 220.

While the particular embodiments illustrated utilize a retaining ring 260, other mechanisms can couple a sampling swab to the trace detection head. For example, the sampling swab can be coupled to the trace detection head by hooks, clamps, or both.

Trace detection sampling swabs can be formed of a variety of materials. Disposable swabs are commonly formed of paper, cotton, fiberglass, a polymer, or a combination thereof. Reusable swabs are commonly formed of fiberglass, metal mesh, carbon, a polymer, or a combination thereof.

The bulk detection head 300 is designed to collected only a small amount of a sample for analysis. Preferably, the bulk detection head 300 minimizes release of any substances collected for bulk analysis.

As illustrated, bulk detection head 300 has a body 310 with supports 315a and 315b, which is adapted for receiving a bulk collector 320. As illustrated, body 310 and bulk collector 320 are cylindrical, though this geometry is not required. Bulk collector 320 has side surface 320a and a base 320b. In some embodiments, bulk collector 320 has a diameter of about 2 cm. Bulk collector 320 has a member 325 that extends outward, generally perpendicular, from base 320b. As illustrated, extended member 325 is cylindrical, but this geometry is not required. Extended member 325 has side portion 325a and base portion 325b. In some embodiments, extended member 325 has a diameter from about 0.3 cm to about 0.65 cm. In some embodiments, base 325b has a surface area less than about 1 $cm^2$. In some embodiments, base 325b has a surface are from about 0.1 $cm^2$ to about 1 $cm^2$.

In some embodiments, bulk collector 320 is removable. Bulk collector can be press-fit onto body 310, which has one or more supporting cross members 315a and 315b. The particular geometry and arrangement of supporting cross members 315a and 315b illustrated is not required, as a variety of suitable shapes are permissible. A cut-out solid, as illustrated, reduces weight. In other embodiments, bulk collector 320 is a fixed component of bulk detection head 300.

As illustrated, body 310 of bulk detection head 300 also includes a groove 310, similar to groove 210a in body 210 of trace detection head. In this manner, body 310 and body 210 can be interchangeable, depending on whether a bulk collector 320 or swab support 220 is coupled to body 310 or 210.

Many analytical instruments only accept a vapor for ionization, and thus it can be necessary to vaporize a sample for analysis. In some embodiments, swab support 220 includes a resistive heating element 230, which is electrically coupled to electrical contacts or interfaces 230a that are positioned at locations 210c set within the lip 210b of body 210. In some embodiments, bulk collector includes a resistive heating element 330, which is electrically coupled to electrical contacts or interfaces 330a that are positioned at locations 310c set within the lip 310b of body 310. Applying a voltage across resistive heating element 230 or 330 causes an increase in temperature of the swab support 220 or bulk collector 320, respectively, thereby increasing the desorption rate of a sample. As illustrated, resistive heating element 330 is only present on the base 325b of extended member 325 to provide selective heating of base 325b. As illustrated, heating element 330 is not present on the base 320b of bulk collector 320, but in other embodiments the resistive heating element can be on other portions of the bulk collector 320. Some analytical instruments provide sufficient heat to vaporize a sample. Thus, a resistive heating element is not required, but including it can make sample desorption more effective.

Trace detection head 200, or a portion thereof, and bulk detection head 300, or a portion thereof, can be configured for registration with an analytical instrument, such as an ion mobility spectrometer, a mass spectrometer, a gas chromatograph, an electrochemical sensor device, or a fluorescent chemical sensor device. When the trace detection head 200 or bulk detection head 300 is inserted into and in registration with an analytical instrument, the electrical contacts 230a and 330a complete an electrical circuit with mating conductive elements on an instrument inlet. Depending on analytical instrument, power can automatically switch on or the further action by the operator may be necessary to switch on the power, after which current flows to the resistive heating element 230 or 330 to increase the temperature of the swab support 220 or bulk collector 320. When the trace detection head 200 or bulk detection head 300 is inserted into and in registration with an analytical instrument, electrical contacts 230a and 330a electrically couple to an electrical power source (e.g., a switchable power source). Switching on the power source allows resistive heating of swab support 220 or bulk collector 320 to a predefined temperature (e.g., 200° C.) in order to vaporize the sample, which is enters into the analytical instrument. In some embodiments, the vapor is actively pumped into the analytical instrument.

Bulk collector 320 is typically formed of a material that permits picking up the sample thereon. In some embodiments, bulk collector 320 is formed of silicone. In some embodiments, bulk collector 320 is formed of ceramic. In some embodiments, bulk collector is formed of polymer that exhibits desired properties at high temperatures, include heat resistance, chemical resistant, low outgassing, and mechanical strength. Example polymers include polyimide and polyphenylsulfone. Swab support 220 can be formed of any of the same materials as bulk collector 320.

Either, or both, the trace detection head 200 and bulk detection head 300 can be removable from wand extension 100. For example, body 110 of wand extension 100 can have a threaded interface 110a for coupling with a mating threaded interface 240a or 340a of a removable detection head. Thus, different types of removable detection heads can be coupled with body 100. In this sense, the removable detection heads are interchangeable. Other mechanism for mechanical coupling are known in the art, including turn lock mechanisms and magnetic coupling mechanisms.

In some embodiments, swab support 220 or bulk collector 320 can be removed and replaced if overly contaminated. Thus, the sampling apparatus 10, which includes wand extension 100, trace detection head 200, and bulk detection head 300, can be cleaned and reused after affixing a new swab support 220 or bulk collector 320, and sampling can be continued.

In some embodiments, the sampling heads can be configured for collecting and/or releasing a desirable amount of material by physical, thermal, electrical, electrostatic, and chemical control to an analytical instrument.

INCORPORATION BY REFERENCE; EQUIVALENTS

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A sampling apparatus for a chemical analyzer comprising:
   a wand extension having ends coupled with a trace detection head and with a bulk detection head;
   wherein the trace detection head comprises:
   a body for receiving a swab support and configured for coupling with the wand extension;
   a retaining ring for coupling a swab to the body of the trace detection head, wherein the body of the trace detection head has a groove for receiving a shuttle that is connected to the retaining ring; and
   a resistive heating element to heat a swab,
   wherein the bulk detection head comprises:
   a body for receiving a bulk collector, wherein the bulk collector comprises a base with a resistive heating element and a member that extends perpendicular from the base of the bulk collector.

2. The sampling apparatus of claim 1, wherein one or more of the trace and bulk detection heads is removable.

3. A method of analyzing a sample, the method comprising contacting a sample with the sampling apparatus of claim 1.

4. The sampling apparatus of claim 1, wherein the resistive heating element of the trace detection head is electrically coupled to an electrical contact on the body of the trace detection head.

5. The sampling apparatus of claim 4, wherein the electrical contact is configured to contact an electrical contact of an analytical instrument upon registration of the trace detection head with the analytical instrument.

6. The sampling apparatus of claim 1, wherein
   the trace detection head includes a sampling interface and a wand extension interface;
   the bulk detection head includes a sampling interface and a wand extension interface; and
   a wand extension including a first interface to which the trace detection head is mechanically coupled and second interface to which the bulk detection head is mechanically coupled, the combination of trace detection head, bulk detection head, and wand extension defining a wand.

7. The apparatus of claim 6, wherein the trace detection head and bulk detection head are removably coupled from the wand extension via the first and second interfaces, respectively.

8. The apparatus of claim 6, wherein the trace detection head sampling interface includes the swab support, and wherein the retaining ring is configured to couple the swab to the swab support in a fixed arrangement.

9. The apparatus of claim 6, wherein the resistive heating element of the trace detection head is configured to be in thermal communication with the swab support, and wherein the trace detection head further includes an electrical interface configured to couple to a corresponding electrical interface of the analytical instrument, and further wherein the electrical interface is coupled to an electrical path between the electrical interface and the resistive heating element of the trace detection head to enable the resistive heating element of the trace detection head to be energized and generate heat when the trace detection head is in a coupled arrangement with the analytical instrument.

10. The apparatus of claim 6, wherein the bulk detection head sampling interface includes the bulk collector projecting from (i) a surface of the bulk detection head or (ii) a surface of an element coupled to the bulk detection head.

11. The apparatus of claim 6, wherein the bulk detection head further includes an electrical interface configured to couple to a corresponding electrical interface of the analytical instrument, and further wherein the electrical interface is coupled to an electrical path between the electrical interface and an integrated heater element to enable the integrated heater element to be energized and generate heat when the bulk detection head is in a coupled arrangement with the analytical instrument.

12. A trace detection head comprising:
a body for receiving a swab support, the body configured for coupling with a wand extension;
a resistive heating element to heat a swab; and
a retaining ring for coupling a swab to the body of the trace detection head;
wherein the body of the trace detection head has a groove for receiving a shuttle that is connected to the retaining ring.

13. The trace detection head of claim 12, wherein the resistive heating element is electrically coupled to an electrical contact on the body of the trace detection head.

14. A sampling apparatus for a chemical analyzer, the sampling apparatus comprising:
a wand extension having first and second ends;
a trace detection head for collecting samples for analysis and configured for coupling to the first end of the wand extension and comprising a resistive heating element; and
a bulk detection head for collecting samples for analysis and configured for coupling to the second end of the wand extension and comprising a resistive heating element.

15. The sampling apparatus of claim 14, wherein the wand extension has a threaded interface for coupling with a mating threaded interface of the trace detection head or for coupling with a mating threaded interface of the bulk detection head.

16. The sampling apparatus of claim 15, further comprising an O-ring or gasket for sealing the threaded interface of the trace detection head or the threaded interface of the bulk detection head.

17. The apparatus of claim 14, further comprising a bulk collector, the bulk detection head further comprising a body configured for receiving a bulk collector.

18. The apparatus of claim 17, wherein the bulk collector comprises a base and a member that extends perpendicular from the base of the bulk collector.

19. The sampling apparatus of claim 18, wherein the member that extends perpendicular from the base of the bulk collector comprises a base of the member, the base of the member having a surface area less than about 1 cm$^2$.

20. The sampling apparatus of claim 19, wherein the base of the member has a surface area from about 0.1 cm$^2$ to about 1 cm$^2$.

21. The apparatus of claim 14, wherein the trace detection head comprises a body for receiving a swab support and configured for coupling with the wand extension.

22. The apparatus of claim 21, further comprising a retaining ring for coupling a swab to the body of the trace detection head.

23. The apparatus of claim 21, wherein the resistive heating element of the trace detection head is configured to heat a swab coupled to the swab support.

24. The sampling apparatus of claim 21, wherein the swab support has a base, the base having a surface area from about 1 cm$^2$ to about 100 cm$^2$.

25. The sampling apparatus of claim 21, wherein the resistive heating element of the trace detection head is configured to be electrically coupled to an electrical contact on the body of the trace detection head.

26. The sampling apparatus of claim 25, wherein the electrical contact is configured to contact an electrical contact of an analytical instrument upon registration of the trace detection head with the analytical instrument.

27. The apparatus of claim 21, wherein the body of the trace detection head has a groove for receiving a shuttle that is connected to the retaining ring.

28. The sampling apparatus of claim 27, wherein the groove has a distal magnet and a proximal magnet to hold the shuttle in an open and closed position, respectively.

* * * * *